May 7, 1935.　　　　G. A. MITCHELL　　　　2,000,090
CAMERA FOCUSING MECHANISM
Filed Feb. 23, 1934　　　　3 Sheets-Sheet 1

Inventor
George A. Mitchell.
Attorney.

May 7, 1935.  G. A. MITCHELL  2,000,090
CAMERA FOCUSING MECHANISM
Filed Feb. 23, 1934   3 Sheets-Sheet 2

Inventor
George A. Mitchell.

Attorney.

May 7, 1935. G. A. MITCHELL 2,000,090
CAMERA FOCUSING MECHANISM
Filed Feb. 23, 1934 3 Sheets-Sheet 3
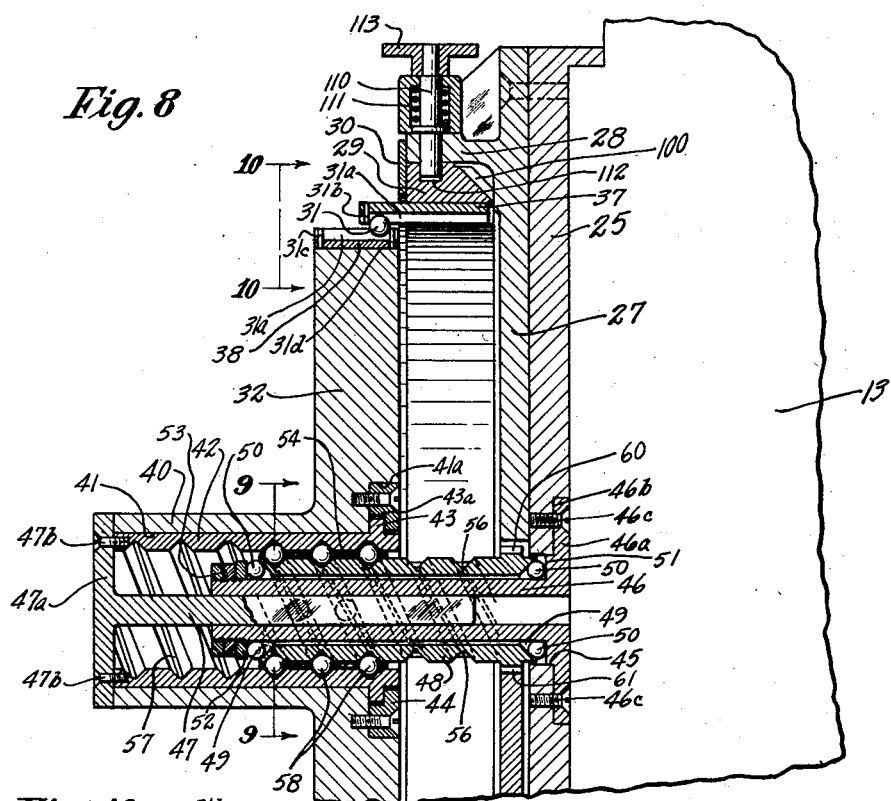
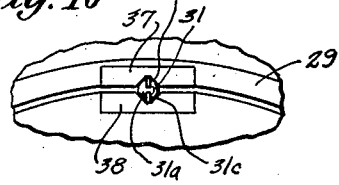
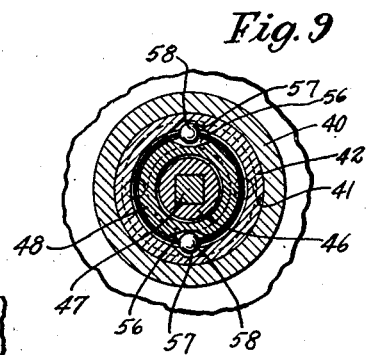
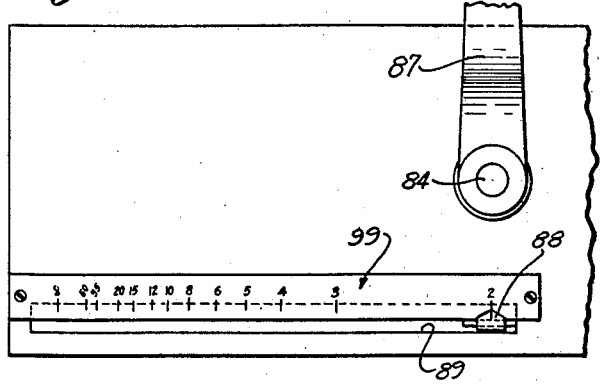
Inventor
George A. Mitchell.
Attorney.

Patented May 7, 1935

2,000,090

UNITED STATES PATENT OFFICE 2,000,090

CAMERA FOCUSING MECHANISM

George A. Mitchell, Los Angeles, Calif., assignor to Mitchell Camera Corporation, West Hollywood, Calif., a corporation of Delaware Application February 23, 1934, Serial No. 712,545

27 Claims. (Cl. 95—45)

This invention has general reference to lens changing and compensating focusing mechanisms for motion picture cameras.

Motion picture cameras are ordinarily equipped with a plurality of photographic lenses of differing focal lengths for use under varying circumstances, and these lenses are sometimes carried on a rotatable lens turret mounted on the head of the camera and operable to bring any selected lens into alinement with the photographic aperture, or there may be provided a single lens holder permanently alined with the photographic aperture and adapted to removably receive the lens called for by the instant occasion. In either case, as is well known, the lens focusing mechanism or focusing scales must be designed to compensate for the different focal length lenses used in the camera, since the distance a given lens must be moved in focusing is determined by the focal length of that lens. Means have accordingly been provided in the prior art for adjusting the velocity ratio between the manual focusing member and the movable lens mount for the purpose of compensating these differences, so that by properly adjusting the focusing mechanism each time a lens change is effected, a fixed range of movement of the manual focusing member along a fixed distance scale is made to serve for all lenses.

It is one object of the present invention to provide an improved focusing mechanism of the type having compensating adjustment means for varying its velocity ratio to correspond with the various focal lengths of lenses to be used. Broadly, it is immaterial to this aspect of the invention whether the camera is of the lens turret type, carrying a plurality of lenses, or of the single lens holder type, as the present focusing mechanism is adaptable to either situation.

It is another important object of the invention, however, to provide automatic means for accomplishing the focusing mechanism compensating adjusting each time a different lens is placed before the photographic aperture. In this aspect the lens turret form of camera is primarily, though perhaps not essentially, in view.

The invention itself will best be understood from the following detailed description of a present illustrative embodiment thereof, reference for this purpose being had to the accompanying drawings, in which:

Fig. 4 is a horizontal section taken as indicated by line 4—4 of Fig. 3;

Fig. 6 is a detail section taken on line 6—6 of Fig. 3;

Fig. 7 is a vertical section taken on broken line 7—7 of Fig. 3;

Fig. 8 is a view to an enlarged scale, taken from Fig. 3;

Fig. 9 is a section taken on line 9—9 of Fig. 8;

Fig. 10 is a detail taken as indicated by line 10—10 of Fig. 8; and

Fig. 11 is a detail of a portion of the rear of the camera.

For simplicity of illustration the camera box and magazine mounted thereon is only conventionally illustrated, since these parts and the mechanism within may be of any suitable or usual type. The invention in its present form is particularly adaptable to the Mitchell type of camera, which comprises a base, a lens turret carrying head rising from the forward end thereof, and a camera box slidable transversely on the base directly behind the head, and the invention is here illustrated in connection with this type of camera. It is to be understood, however, that this typification of the invention is merely illustrative of rather than limitative on the invention.

Figure 2:
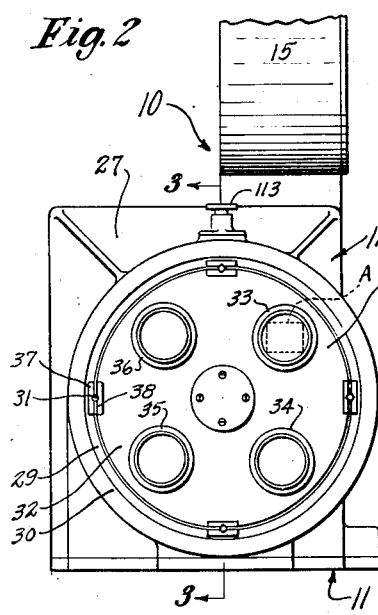
Fig. 2 is a side elevation of the camera shown in Fig. 1.
Figure 1:
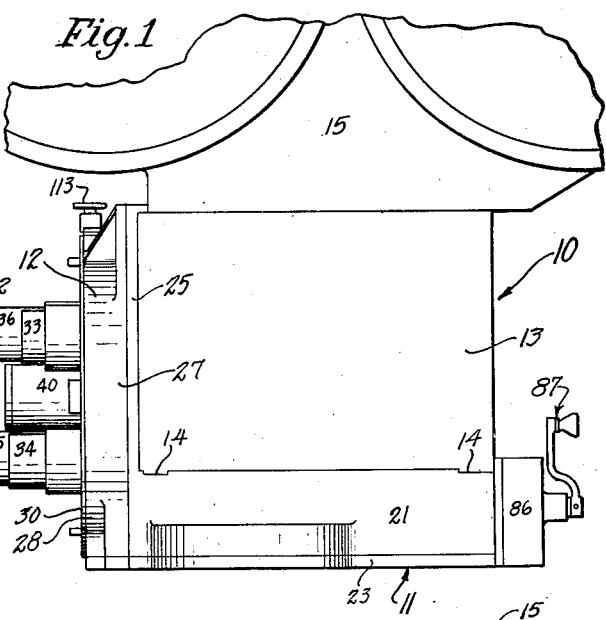
Figure 1 is a side elevation of a conventional motion picture camera equipped with my invention.

In the drawings numeral 10 designates generally such a motion picture camera, comprising base 11, head 12 rising from the forward end of said base, camera box 13 supported on base 11 immediately to the rear of head 12 and slidable transversely on the base in ways 14, and film magazine 15 mounted on camera box 13. Within box 13 is the usual exposure aperture plate and intermittent mechanism for moving the film F past said plate, these parts not being illustrated since they may be of any conventional design. When the camera box is positioned at the right hand side of the camera base, as viewed from the front (Fig. 2) the film F carried thereby is in alinement with the photographic aperture A of the camera head and is therefore in "taking" position.

When the photographic lens is to be accurately focused camera box 13 is moved transversely to the left and an optical focusing tube, not shown, is brought into alinement with aperture A and the photographic lens then in position before the aperture. After focusing, the camera box is returned to the photographing position of Fig. 2.

The camera base includes an upper horizontal base plate 20 which supports camera box 13, and vertical sides 21 and 22 integral with and depending from plate 20. A bottom wall 23 is fastened between the lower edges of side plates 21 and 22. At the forward end of base plate 20 is a vertical head plate 25, said head plate being immediately forward of the transversely movable camera box. Mounted adjacent the forward side of this plate 25 is turret-carrying head casting 27. This casting is formed with a forwardly extending annular flange 28, within which is rotatably taken a turret carrying ring 29. A retaining ring 30 affixed to the outer end of flange 28 overhangs said ring 29 and confines it within flange 28. The photographic lens turret 32, provided as shown with spaced photographic lens mountings 33, 34, 35 and 36, is mounted within ring 29, and is non-rotatable with reference to said ring but is limitedly extensible forwardly from the ring from the retracted full line position illustrated in Fig. 3. Although various mountings to accomplish this purpose may be utilized, I show a preferred mounting comprising a set of four bearings, each embodying a bearing ball 31 retained between longitudinal V-shaped grooves 31a formed in bearing members 37 and 38 set into slots cut in the inner surface of ring 29 and the periphery of turret head 32, respectively. Members 37 project as shown forwardly from ring 29 in order to accommodate the required forward extension of the turret. Retaining means, as pins 31b, 31c and 31d may be provided to prevent loss of the balls. It will be evident that the turret is free to move on its axis in and out of ring 29. It will also be evident that the balls retained in the V-grooves of members 37 and 38 key turret 32 against relative rotation within ring 29.

For the purpose of releasably locking the lens turret accurately in the four positions of lens alinement with the photographic camera aperture A, I show the head flange 28 provided at the top with a spring pressed locking plunger 110 adapted to be projected by a spring 111 into properly located apertures 112 in the periphery of turret carrying ring 29. The upper end of said plunger has a finger piece 113 by means of which it may be conveniently manipulated.

The lens turret has been described as freely movable forwardly and rearwardly with reference to the camera body, and in accordance with the here illustrated form of the invention this bodily movement of the turret is utilized in focusing the photographic lenses, which are mounted in fixed position on the turret. The lens focusing mechanism is therefore connected directly to turret 32 for the purpose of moving it and the lenses carried thereby bodily forwardly or rearwardly in making focusing adjustments.

In the present form of the invention, turret 32 has a hub 40 and a central axial bore 41, and is rotatable on a tube 42 within bore 41. Tube 42 has near its rearward end an annular flange 43 which is confined within an inwardly facing annular groove 43a afforded by flanged ring 44 mounted in turret countersink 41a. The turret is free to rotate on tube 42, but is prevented by flange 43 and ring 44 from axial movement relative thereto.

Extending axially through the bore of tube 42 and through a bore 45 in wall 25 is a mounting pin 46 having an enlarged head 46a received within a countersink 46b in the rear surface of head plate 25. This pin may be fastened in place as by screws 46c.

A shaft 47 extends axially through pin 46 and is arranged to move freely longitudinally of the pin but is non-rotatable with reference thereto. As shown, shaft 47 and the opening through pin 46 may for this purpose be square in cross section. The forward end of shaft 47 has an enlarged flat head 47a which is of the same diameter as turret boss 40 and faces against the outer end thereof, as shown, and is affixed as by screws 47b to the end of tube 42 on which the turret is rotatably mounted. Tube 42, being fast to non-rotatable but longitudinally movable shaft 47, is thus fixed against rotation, but is arranged to move and to carry the turret in a direction longitudinally of its axis. Between pin 46 and tube 42 is a gear sleeve 48 having at its opposite ends conical seating surfaces 49 bearing against balls 50 confined between pin shoulder 51 and washer 52, the latter mounted on the forward end of pin 46 and being set up by means of a nut 53 on the screwthreaded forward extremity of said pin.

A screw connection is provided between gear sleeve 48 and tube 42. Instead of utilizing conventional screwthreads for this purpose, however, I preferably provide a freely operable anti-friction screw connection between these members. For this purpose the exterior surface of sleeve 48 and the interior surface of tube 42 are cut with corresponding spiral, V-shaped grooves 56 and 57, respectively, and placed in the spiral raceways thus afforded are bearing balls 58. In order to give the screw a comparatively long lead, double spiral grooves may preferably be provided, as indicated. A ball cage 54 is preferably provided, and serves to space the balls along the spiral raceway. There is thus provided an anti-friction screw connection between sleeve 48 and tube 42, and it will be evident that upon rotation of sleeve 48, tube 42 and the lens turret mounted thereon are screwed forwardly and rearwardly with reference to turret mounting ring 29.

For the purpose of so rotating sleeve 48, said sleeve has near its rearward end spur gear teeth 60 in mesh with rack gear teeth 61 of a member 62 lying between turret head 32 and wall 25 and accommodated within a recess 27a formed in head casing 27 for horizontal movement transversely of the camera (see Fig. 7). Said member 62 has near its lower edge a horizontally extending dovetailed portion 63 which slides within a dovetailed way 64 cut in wall 25, as shown clearly in Figs. 3 and 4.

Member 62, which may be referred to as a slide member, is moved back and forth by a lever 70 which extends rearwardly through camera base 11, and which has a forwardly and rearwardly adjustable vertical fulcrum axis B—B. This lever transmits motion to rack gear 61 from a rearward slide member 79, which is constrained to movement parallel to the movement of slide member 62. As shown, member 79 has for this purpose a dovetail portion 80 slidable in a horizontal dovetail way 81 which is parallel to the movement of slide member 62. Although the lever may be constructed in various manners, I here show it as a telescoping forward sleeve 71 and rearward rod 72, the sleeve having fastened therein, as by pin 73, a forwardly extending rod 74. The forward and rearward extremities of the lever, that is, the forward end of rod 74 and the rearward end of rod 72, are pivotally connected by means of pins 75 and 78 to slide members 62 and 79, respectively. In the embodiment shown the extremity of lever rod 74 extends through a horizontal slot 25a in wall 25 and into a recess 75a formed in the dovetail 63 of slide member 62, and the pivot pin 75 is set into the dovetail, as clearly shown in Figs. 3 and 4.

Slide member 79 has affixed thereto a rack gear 82 meshing with a gear 83 which is mounted on a shaft 84, said shaft being journalled in the rear wall of a housing member 86 that closes the rear side of the camera base. On the rear end of shaft 84 is a manual operating arm or crank 87.

The adjustable pivot mounting for the lever comprises a sleeve 90 within which lever sleeve 71 is longitudinally slidable, and which sleeve 90 is vertically trunnioned on axis B—B in slide carriage 91. Thus sleeve 90 is furnished with upper and lower trunnions 93 and 94 which are respectively rotatable in carriage slide plate 95 and yoke 96 suspended from said plate 95, in the manner clearly shown in Fig. 6. The arms of the yoke 96 are laterally spaced on opposite sides of sleeve 95 to give the necessary clearance for the required angular swing of said sleeve with the lever. Plate 95 is of dovetailed cross section and slides longitudinally of the camera, and of lever 70, in a dovetailed way 97 cut in a guide plate 98 secured to the underside of base plate 20. The means for moving the fulcrum slide carriage with reference to guide plate 98 will be described hereinafter, it being sufficient for the present to note that sleeve 90 and its fulcrum mounting are shiftable by movement of carrier plate 95 in guide plate 98.

From the foregoing it will be evident that operation of manual control arm 87 acts through gears 83 and 82 and slide member 79 to swing lever 70 on fulcrum axis B—B, causing translation of rack 61 and rotation of gear 60 and sleeve 48 to produce forward or rearward movement of the lens turret. In this action lever sleeve 71 and lever rod 72 have telescopic movement with reference to each other, and sleeve 71 has of course some sliding movement within trunnion sleeve 40. Thus it will be evident that the two pivot connections 75 and 78 at the ends of the variable length lever 70 move in lines which are parallel to each other. From this it will be seen that the amount of movement of pivot 75 and hence of slide member 62 will always be in direct proportion to the amount of movement of slide member 79 and its pivot connection 78 with the lever. The amount of such movement imparted to slide member 62 by a given movement of slide member 79, however, obviously depends upon the position of the lever fulcrum along the length of the lever, and such an adjustment is utilized to vary the velocity ratio of the mechanism to suit various focal length lenses. I have provided automatic means for accomplishing this adjustment in accordance with rotation of the lens turret in bringing various focal length lenses before the photographic aperture A of the camera, although this provision will not be used in cases wherein the lens turret or some similar movable lens carrier is not utilized, as for instance where the camera is furnished with but a single lens holder. For this reason the mechanism will first be considered without regard to the automatic fulcrum adjusting means, and for this purpose it is assumed that the fulcrum carriage is to be moved in its guide manually. It will be obvious that suitable scales, calibrated in focal lengths of lenses, may be provided to enable making this adjustment manually.

As previously stated, the direction of the fulcrum, in the present illustrated form, is longitudinal of the camera, and is therefore perpendicular to the parallel lines of movement of the transversely movable slide members 62 and 79. Now there is obviously one position for the lever which is common for all positions of the fulcrum along its line of movement, i. e., parallel to the direction line of fulcrum adjustment movement, or, in the present specific case, perpendicular to the lines of movement of slide members 62 and 79. This common lever position, which is shown in full lines in Fig. 4, is made the position for infinity focus, and at this common infinity position the rearward slide member 79 and manual operating member 87, and also the forward slide member 62 and turret driving gear sleeve 48 operated by the lever, as well as the turret itself, obviously take a common position for all positions of adjustment of the lever fulcrum. Adjustment of the position of the lever fulcrum when the lever is in this described infinity position (parallel to the direction line of fulcrum adjustment) thus serves simply to move fulcrum sleeve 90 longitudinally on lever sleeve 71, without affecting the position of the lever, and consequently without altering the position of members 62, 48, and the lens turret.

The lens turret is thus seen to have a fixed, definite position along its axis for the described infinity position of the lever. The photographic objectives are then so mounted on the turret that when the turret is in this fixed position for infinity focus, each objective is located ahead of the focal plane of the camera (the film) by a distance equal to its own focal length.

Figure 3:
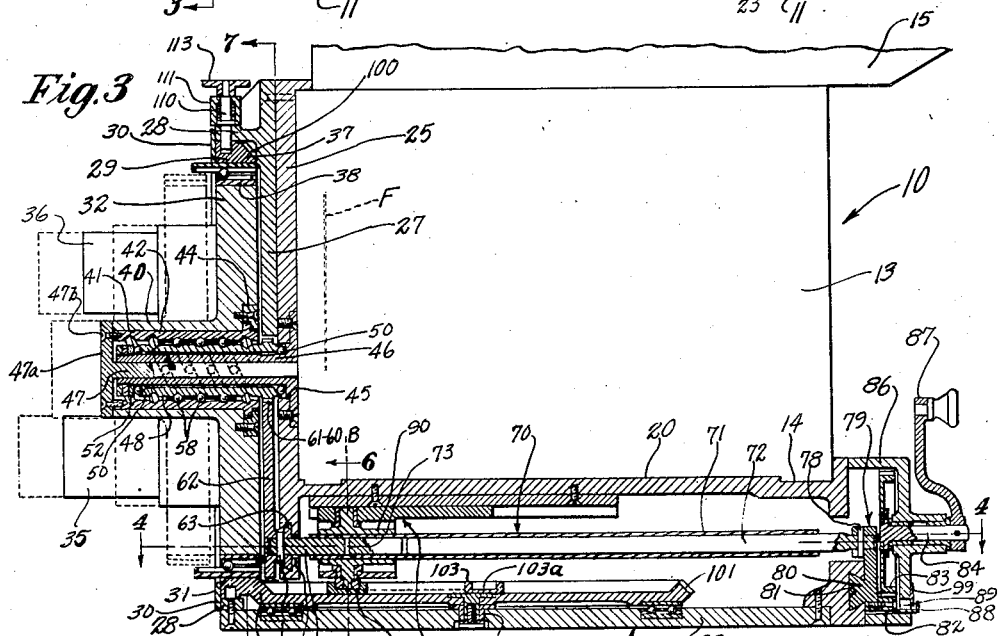
Fig. 3 is a vertical longitudinal section taken on line 3—3 of Fig. 2.
Figure 5:
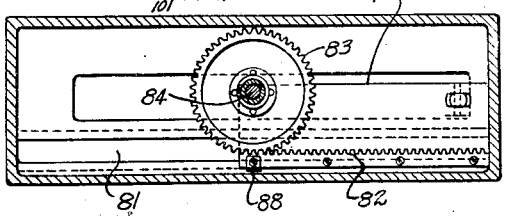
Fig. 5 is a vertical detail section taken on line 5—5 of Fig. 4.

Assuming the parts then to be in the full line, infinity focus position represented in Figs. 3 and 4, movement of manual member 87 in a left-handed direction, as viewed from the rear of the camera, causes translation of rearward slider member 79 to move lever 70 toward the angular position shown in dotted line in Fig. 4. This causes forward slider member 62 to move towards the right, as viewed from the front of the camera, whereby its rack teeth effect lefthanded rotation of gear 60 and sleeve 48, causing action through balls 58 to screw outer tube 42 and the lens turret mounted thereon forwardly towards the extreme forward or close-up focusing position indicated in dotted lines in Fig. 3. And the amount of this forward movement imparted to the lens turret by a given movement of manual member 87 depends of course upon the adjusted location of the lever fulcrum, as previously explained.

Thus by longitudinal adjustment of the fulcrum position of the lever member, the velocity ratio between manual focusing member 87 and lens turret 32 is varied, and if a fixed distance scale is provided for the manual member (or for any invariably moving part of the mechanism between the manual member and the lever), starting with the common position for all lenses for infinity focus and marked off at suitable distance intervals on down to "close-up", then proper positioning of the fulcrum so adjusts the mechanism that full movement of manual focusing member 87 over this fixed range of positions from infinity to close-up produces any total range of lens turret movement required for any focal length lens. For instance, I have here shown the rack gear 82 on rearward slider member 79 provided with an indicator 88 which extends rearwardly through a slot 89 in the rear wall of housing member 86, and a properly calibrated distance scale 99 is provided on said rear wall for said indicator, as clearly shown in Figs. 3 and 11.

As has been stated, the longitudinal adjustment of the fulcrum position may be accomplished manually. I prefer, however, to provide means for accomplishing the fulcrum adjustment automatically by virtue of rotation of the lens turret in bringing different lenses into alinement with the photographic camera aperture A. For this purpose, in the present embodiment, the turret carrying ring 29 is furnished with bevel gear teeth 100 which mesh with a bevel gear 101 journalled at 102 on the camera base bottom 23. The ratio of gear ring 29 to gear 101 is preferably one to one, so that gear 101 makes one complete revolution for one complete revolution of the lens turret. The center of gear 101 is preferably directly under lever 70 when said lever is in its right angle or infinity focus position (Fig. 4). The upper face of bevel gear 101 carries a cam member 103 having a continuous, upwardly-facing cam groove 103a, this cam member and groove preferably extending entirely around the center of gear 101 and closing on itself, as shown. It will be noted from Fig. 4 that lever 70, along which the trunnion carriage 96 is slidable, twice intersects cam groove 103a; the lower sleeve trunnion 94 is then provided with a follower bushing 105 which engages in the cam groove 103a at the forward intersection of said groove by lever 70, or in other words, between the center of gear 101 and slide member 62. Rotation of the lens turret to bring different focal length lenses into photographing position acts through balls 35 to rotate bevel gear ring 29, thereby causing rotation of bevel gear 101 meshing therewith, and this rotation causes cam groove 103 to act on the cam follower extremity 104 of the lower lever trunnion to move said trunnion along its fixed line movement, thereby adjusting the trunnion axis of lever 70 to correspond with the focal length of the lens which is being moved into position. The cam groove 103a is accordingly so designed that when the turret is rotated to bring any one of the lenses to photographing position, the cam groove has moved the trunnion carriage to such position as will give the proper velocity ratio between the two ends of lever member 70 for that lens.

Assuming now four photographic lenses equally spaced about the lens turret and having differing focal lengths, the cam groove is provided with four points or positions, spaced 90° apart, which come successively into engagement with the lower pivot end of the trunnion carriage to adjust the position of the trunnion axis along lever 70, and these points are of course so located on gear 101 as to bring the fulcrum axis to the proper positions along the length of the lever for the corresponding lenses on the turret. As here shown, these points are included within 20° circumferential sections a, b, c and d of the groove, and by this provision the fulcrum axis is in adjusted position within 10° of arc on either side of the final position of cam gear 101, thus providing a margin of safety to care for any back lash in the mechanism, and fully assuring that when the turret has moved a lens to photographing position, the fulcrum will be accurately in position to give the mechanism that required velocity ratio for that lens.

The 20° circumferential cam groove sections a, b, c and d are connected by smooth curved connecting portions, as shown, so that the trunnion carriage will move easily as the lens turret and gear 101 are rotated. Preferably, the 20° cam sections for the longest and the shortest focal length lenses are placed opposite one another on gear 101, this being of advantage in that the long and short focal length lenses are then opposite one another on the lens turret, so that the long lens tube of the former will not interfere with the wide angle field of the latter. Fig. 4 accordingly shows the short focal length cam section a directly across from the longest focal cam section c. It will be noted that with the continuous type of cam here provided, the turret may be rotated in either direction to bring a desired lens into photographing position and to set the velocity ratio of the focusing mechanism.

It is of course possible to utilize more or less than four lenses on the turret, as space will permit, and it is not necessarily essential that the lenses be uniformly spaced about the turret, the shape of the cam groove in any case being simply designed to bring the lever fulcrum into proper position for the lens at that time alined before the aperture.

It is to be understood that the drawings and description are to be considered merely as illustrative of and not restrictive on the broader claims appended hereto, for various changes in design, structure and arrangement may be made without departing from the spirit and scope of said claims.

I claim:

1. In a lens focusing mechanism, the combination of a movable lens carrier member adapted to be moved to carry a lens forwardly and rearwardly, and means for moving said carrier member embodying a lens carrier operating member movable in a straight line and operably connected with said lens carrier member, an operating lever connected to said member, and a fulcrum for said lever adjustable in a direction at right angles to the line of movement of said lens carrier operating member.

2. In a lens focusing mechanism, the combination of a movable lens carrier member adapted to be moved to carry a lens forwardly and rearwardly, and means for moving said carrier member embodying an operating lever operatively interconnected with said lens carrier member and adapted to take a position wherein said lens carrier is in a rearward infinity focus lens position, and a fulcrum for said lever adjustable in a direction line parallel to said lever position for infinity focus.

3. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, a lever for transmitting motion between said slide members, and fulcrum for said lever adjustable along a straight line to different positions relative to said slide members.

4. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, a lever for transmitting motion between said slide members, and a fulcrum for said lever adjustable along a line at right angles to the lines of movement of said slide members.

5. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, a lever connected at its two ends to said slide members, and a fulcrum for said lever adjustable along a straight line to different positions between said slide members.

6. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, a lever connected at its two ends to said slide members, and a fulcrum for said lever adjustable along a line at right angles to said slide members.

7. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, a lever for transmitting motion between said slide member and adapted to take a position wherein said lens carrier is in a rearward infinity focus lens position, and a fulcrum for said lever adjustable in a direction line parallel to said lever position for infinity focus.

8. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, an extensible lever pivotally connected at one end with one of said slide members and pivotally connected at the other end with the other of said slide members, and a fulcrum for said lever adjustable to different positions between said slide members.

9. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, an extensible lever embodying two telescoping sections, a pivot connection for one of said sections to one of said slide members and a pivot connection for the other of said sections with the other of said slide members, and a fulcrum for said lever adjustable to different positions with reference to the lever.

10. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, an extensible lever embodying two telescoping sections, a pivot connection for one of said sections with one of said slide members and a pivot connection for the other of said sections with the other of said slide members, and a fulcrum for said lever adjustable along a line at right angles to the directions of movement of said slide members.

11. In a lens focusing mechanism, the combination of a movable lens carrier member adapted to be moved to carry a lens forwardly and rearwardly, and means for moving said carrier member embodying a slide member movable in a straight line, another slide member movable in a line parallel to said first slide member, an extensible lever embodying telescopically arranged tube and rod sections, a pivot connection between said rod section and one of said slide members, a pivot connection between said tube section and the other of said slide members, a sleeve slidably taking said telescopic lever, trunnion mounting means for said sleeve, and means for adjusting the position of said trunnion mounting means along said lever.

12. The combination comprising an inner cylindrical member, mounting means supporting said member for rotation on its axis but holding it against movement along its axis, means for rotating said cylindrical member, an outer tubular member surrounding said cylindrical member, the outer and inner surfaces of said inner cylindrical and outer tubular members respectively having spiral grooves formed therein, balls in the spiral raceways afforded by said grooves to interconnect said members, and supporting means guiding said outer tubular member to move along its axis but restraining said member against rotation on its axis relative to said supporting means.

13. In a lens focusing mechanism, the combination comprising an inner cylindrical member, mounting means supporting said member for rotation on its axis but holding it against longitudinal movement along its axis, means for rotating said cylindrical member, an outer tubular member surrounding said cylindrical member, the outer and inner surfaces of said inner cylindrical member and said outer tubular member respectively having spiral grooves formed therein, balls in the spiral raceways afforded by said grooves to interconnect said members, means holding said tubular member against rotation on its axis, a lens turret rotatably mounted on but restrained against axial movement with reference to said tubular member, supporting means guiding said lens turret to move along its axis with longitudinal axial movement of said tubular member, and means for releasably holding said lens turret against rotation on its axis.

14. In a lens focusing mechanism, the combination comprising an inner cylindrical member, mounting means supporting said member for rotation on its axis but holding it against longitudinal movement along its axis, means for rotating said cylindrical member, an outer tubular member surrounding said cylindrical member, the outer and inner surfaces of said inner cylindrical member and said outer tubular member respectively having spiral grooves formed therein, balls in the spiral raceways afforded by said grooves interconnecting said members, means holding said tubular member against rotation on its axis, a lens turret rotatably mounted on but restrained against axial movement with reference to said tubular member, a rotatable supporting member for said lens turret, means in association with said supporting member guiding said turret to move along its axis but holding it against rotation with reference to said member, and means for releasably holding the turret supporting member against rotation.

15. In a lens focusing mechanism, the combination comprising an inner cylindrical member, mounting means supporting said member for rotation on its axis but holding it against longitudinal movement along its axis, means for rotating said cylindrical member, an outer tubular member surrounding said cylindrical member, said outer tubular member having a screw connection with said inner cylinder member, a lens turret rotatably mounted on but restrained against axial movement with reference to said tubular member, supporting means guiding said lens turret to move along its axis with longitudinal axial movement of said tubular member, and means for releasably holding said lens turret against rotation on its axis.

16. In a lens focusing mechanism, the combination comprising an inner cylindrical member, mounting means supporting said member for rotation on its axis but holding it against longitudinal movement along its axis, means for rotating said cylindrical member, an outer tubular member surrounding said cylindrical member, said outer tubular member having a screw connection with said inner cylindrical member, a lens turret rotatably mounted on but restrained against axial movement with reference to said tubular member, a rotatable supporting member for said lens turret, means in association with said supporting member guiding said turret to move along its axis but holding it against rotation with reference to said member, and means for releasably holding the turret supporting member against rotation.

17. In a lens focusing mechanism, the combination of a lens carrier member adapted to support a plurality of lenses, said member being mounted to move in a forwardly and rearwardly direction for focusing purposes and to be shifted in a direction transverse of said first mentioned direction to place different lenses in a given operative position, means including a manual operating member for moving said carrier member forwardly and rearwardly, said means embodying velocity ratio adjustment means whereby the amount of such movement imparted to the lens carrier by a given movement of the manual member may be varied to suit different focal length lenses on the carrier member, and automatic means for adjusting the last mentioned means actuated by virtue of shifting the carrier member in placing different lenses in said operative position.

18. In a lens focusing mechanism, the combination of a lens carrier adapted to support a plurality of lenses, said member being mounted to move to place different lenses in a given operative position, means including a manual operating member for effecting forward and rearward lens focusing movement, said means embodying velocity ratio adjustment means whereby the amount of lens focusing movement imparted by a given movement of the manual member may be varied to suit different focal length lenses, and automatic means for adjusting the last mentioned means actuated by virtue of shifting the carrier member in placing different lenses in said operative position.

19. In a lens focusing mechanism, the combination of a rotatable lens turret adapted to support a plurality of lenses to be rotated to place its lenses successively in operative position, said lens turret being mounted to move along its axis for focusing movement, means including a manual operating member for effecting movement of the lens turret along its axis, said means embodying velocity ratio adjustment means whereby the amount of lens focusing movement imparted by a given movement of the manual member may be varied to suit different focal length lenses, and means for adjusting the last mentioned means actuated by virtue of rotation of the lens turret in carrying different lenses to operative position.

20. In a lens focusing mechanism, the combination of a rotatable lens turret adapted to support a plurality of lenses and to be rotated to carry its lenses successively to a given operative position, means including a manual operating member for effecting focusing movement of said turret carried lenses, said means embodying velocity ratio adjustment means whereby the amount of lens focusing movement imparted by a given movement of the manual member may be varied to suit different focal length lenses, and means for adjusting the last mentioned means actuated by virtue of rotation of the lens turret in carrying lenses to operative position.

21. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means including a manual operating member for effecting axial movement of the lens turret, said means embodying velocity ratio adjustment means whereby the amount of lens focusing movement imparted by a given movement of the manual member may be varied to suit different focal length lenses, and means actuated by rotation of said turret carrying member for operating said velocity ratio adjustment means.

22. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means including a manual operating member for effecting axial movement of the lens turret, said means embodying velocity ratio adjustment means whereby the amount of lens focusing movement imparted by a given movement of the manual member may be varied to suit different focal length lenses, and gear means driven by rotation of the turret carrying member adapted to operate said velocity ratio adjustment means.

23. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means for effecting axial movement of the lens turret, said means including a lever, and a fulcrum for said lever adjustable to different positions to vary the velocity ratio of said means, and means actuated by rotation of said turret carrying member for adjusting the position of said lever fulcrum.

24. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means for effecting axial movement of the lens turret, said means including a lever, and a fulcrum for said lever adjustable to different positions to vary the velocity ratio of said means, a gear on said turret carrying member, a second gear meshing therewith, and means operated by the last mentioned gear for adjusting the position of the lever fulcrum to correspond properly with the focal length of lenses brought to operative position by rotation of the turret carrying member.

25. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means for effecting axial movement of the lens turret, said means including a lever, and a fulcrum for said lever adjustable to different positions to vary the velocity ratio of said means, and cam means operated by rotation of said turret carrying member and adapted to adjust the position of the lever fulcrum to correspond properly with the focal lengths of lenses brought to operative position by rotation of the turret carrying member.

26. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means for effecting axial movement of the lens turret, said means including a lever, and an adjustable fulcrum for said lever constrained to move in a line along the lever to vary the velocity ratio of said means, a gear on said turret carrying member, a second gear meshing therewith, and a cam on the second mentioned gear adapted to move said fulcrum along its line of movement.

27. In a lens focusing mechanism, the combination of a rotatable lens turret adapted to support a plurality of lenses, a turret carrying member rotatable on the axis of said turret, said member supporting the turret for lens movement along its axis but holding it against rotation with reference to said member, said turret carrying member adapted to be rotated to place different turret carried lenses in a given operative position, means for effecting axial movement of the lens turret, said means including a lever, and an adjustable fulcrum for said lever constrained to move in a line along the lever to vary the velocity ratio of said means, and cam means operated by rotation of the turret carrier member adapted to move said fulcrum along its line of movement.

GEORGE A. MITCHELL.